United States Patent [19]
Boette et al.

[11] Patent Number: 5,810,178
[45] Date of Patent: Sep. 22, 1998

[54] EQUIPMENT MOUNTING FRAME FOR AIRCRAFT

[75] Inventors: David M. Boette, Aurora; Scott B. Williams, Littleton; Treg P. Manning, Lakewood; Richard A. Little, Aurora, all of Colo.

[73] Assignee: Air Methods Corporation, Englewood, Colo.

[21] Appl. No.: 694,479

[22] Filed: Aug. 7, 1996

[51] Int. Cl.⁶ .................................................... A47F 7/00
[52] U.S. Cl. ....................................................... 211/86.01
[58] Field of Search ...................... 211/86.01; 244/118.1

[56] References Cited

U.S. PATENT DOCUMENTS

| | | | |
|---|---|---|---|
| 3,605,136 | 9/1971 | Vichness et al. | 5/8 |
| 3,741,504 | 6/1973 | Alberti et al. | 244/137 R |
| 3,840,265 | 10/1974 | Stirling et al. | 296/19 |
| 4,077,590 | 3/1978 | Shorey | 244/118 R |
| 4,153,225 | 5/1979 | Paulsen | 244/118 R |
| 4,178,032 | 12/1979 | Hone | 296/19 |
| 4,378,128 | 3/1983 | Holling et al. | 296/19 |
| 4,388,030 | 6/1983 | Skaale | 410/69 |
| 4,483,499 | 11/1984 | Fronk | 244/118.1 |
| 4,783,025 | 11/1988 | Moffett | 244/118.5 |
| 4,989,809 | 2/1991 | Arnold | 244/137.1 |
| 5,201,481 | 4/1993 | Hararat-Tehrani | 244/118.1 |
| 5,234,297 | 8/1993 | Wieck et al. | 410/77 |
| 5,370,342 | 12/1994 | Nordstrom | 244/118.1 |
| 5,372,339 | 12/1994 | Morgan | 244/118.5 |
| 5,489,172 | 2/1996 | Michler | 410/105 |
| 5,517,895 | 5/1996 | Sanderson | 89/37.16 |

OTHER PUBLICATIONS

Brochure, Heli–Dyne Systems, Inc.

*Primary Examiner*—Alvin C. Chin-Shue
*Assistant Examiner*—Sarah Purol
*Attorney, Agent, or Firm*—Holme, Roberts & Owen

[57] ABSTRACT

The present invention is directed to an equipment mounting rack for use in transport aircraft. The rack releasably engages structural members of the aircraft for rapid rack removal. The support legs of the rack are designed to buckle in a predetermined manner to provide enhanced aircraft safety, especially in the event of a crash of the aircraft.

19 Claims, 5 Drawing Sheets

5,810,178

EQUIPMENT MOUNTING FRAME FOR AIRCRAFT

FIELD OF THE INVENTION

This invention generally relates to an equipment mounting system for transport aircraft and, more particularly, to an equipment mounting system having fasteners for removably connecting to a structural member of the aircraft and/or support legs that buckle in a predetermined manner.

BACKGROUND OF THE INVENTION

The air-medical industry has long recognized the importance of providing effective medical attention to a patient during air transport of the patient from the emergency site to a permanent medical facility. To provide such medical attention, an efficiently designed patient transport aircraft interior is a necessity. An important component in designing the aircraft interior is the configuration of the equipment mounting rack used to support the various pieces of medical equipment required for patient treatment.

A number of considerations are important in designing the equipment mounting rack. By way of example, the rack should stow the medical equipment in locations that facilitate attendant access to the patient and medical equipment during air transport. The rack should be relatively lightweight and position the equipment in locations that do not detrimentally affect the balance and performance of the aircraft. The rack should be capable of carrying a variety of types of medical equipment to provide enhanced aircraft mission versatility. The rack should be strong, easily installable and easily maintainable. Finally, the rack should not provide an increased risk of injury to passengers in the event that the aircraft crashes.

SUMMARY OF THE INVENTION

Accordingly, it is a primary object of the present invention to provide an efficiently designed equipment rack for a medical transport aircraft.

The present invention realizes this and other objectives by providing an equipment mounting system for use in a transport aircraft, particularly medical transport aircraft, that has the following components: (i) support legs each having upper and lower ends for engaging a structural member of the aircraft; (ii) means for releasably engaging the upper and lower ends of at least one of the support legs with the structural member (e.g., releasable fasteners); and (iii) an equipment mounting rack including first and second crossmembers for supporting equipment.

The equipment mounting rack is readily removable from the aircraft to provide enhanced mission capabilities and therefore aircraft versatility. The ability to rapidly exchange equipment mounting racks permits a wide variety of equipment types to be mounted on different equipment mounting racks and the racks exchanged before each mission to satisfy that particular mission's requirements. Accordingly, a single aircraft can be suitable for a significantly wider variety of missions than is possible for the nonremovable (i.e., permanently mounted) equipment mounting racks presently in use.

The support legs can be configured to connect to existing hardpoints in the aircraft structural frame to reduce or eliminate the number and types of structural modifications required to accommodate the rack. As will be appreciated, modifying the aircraft support frame to accommodate the rack can detrimentally impact aircraft strength and performance. The weight distribution on each of the upper and lower ends of the support legs can be designed to be less than the load rating (i.e., loading capacity) of the corresponding hardpoint. The weight of the rack can be distributed as desired by utilizing lightweight, durable, tubular support legs and crossmembers and modular pieces of equipment.

The means for releasably engaging the support legs to the aircraft structural member(s) can be any of a variety of releasable fasteners. By way of example, one desired releasable fastener has a protruding member that is received in the slot formed by the arms of a C-shaped fitting attached to the aircraft structural member. After being received by the C-shaped fitting, the fastener is placed into a locked position. To release the fitting from the fastener, the fastener is placed into an unlocked position, and the protruding member is removed from the slot.

In another embodiment of the present invention, the equipment mounting rack includes means for buckling the support leg in response to a compressive load (e.g., crash load) applied to the upper and/or lower ends of the support leg. The means for buckling causes the support leg to deform in a predetermined manner in response to the compressive load. The ability of the rack to deform in a predetermined manner increases passenger safety, especially in the event of a crash of the aircraft, because the support legs can be prevented from damaging or puncturing sensitive parts of the aircraft, such as fuel storage tanks.

The means for buckling can have a variety of configurations. By way of example, the means for buckling can be a second segment of the support leg positioned between first and third segments of the support leg, with the second segment being oriented transversely to the first and third segments. In the event a compressive load is applied to the support leg, the shear stress along the second segment exceeds the shear stress along the first and third segments. In another example, the second segment has a smaller cross-sectional area than either the first and third segments to cause the total stress in the second segment to exceed the total stress in the first and third segments. In a further example, the second segment can have a yield strength that is lower than the yield strengths of the first and third segments.

DETAILED DESCRIPTION

Figure 1:
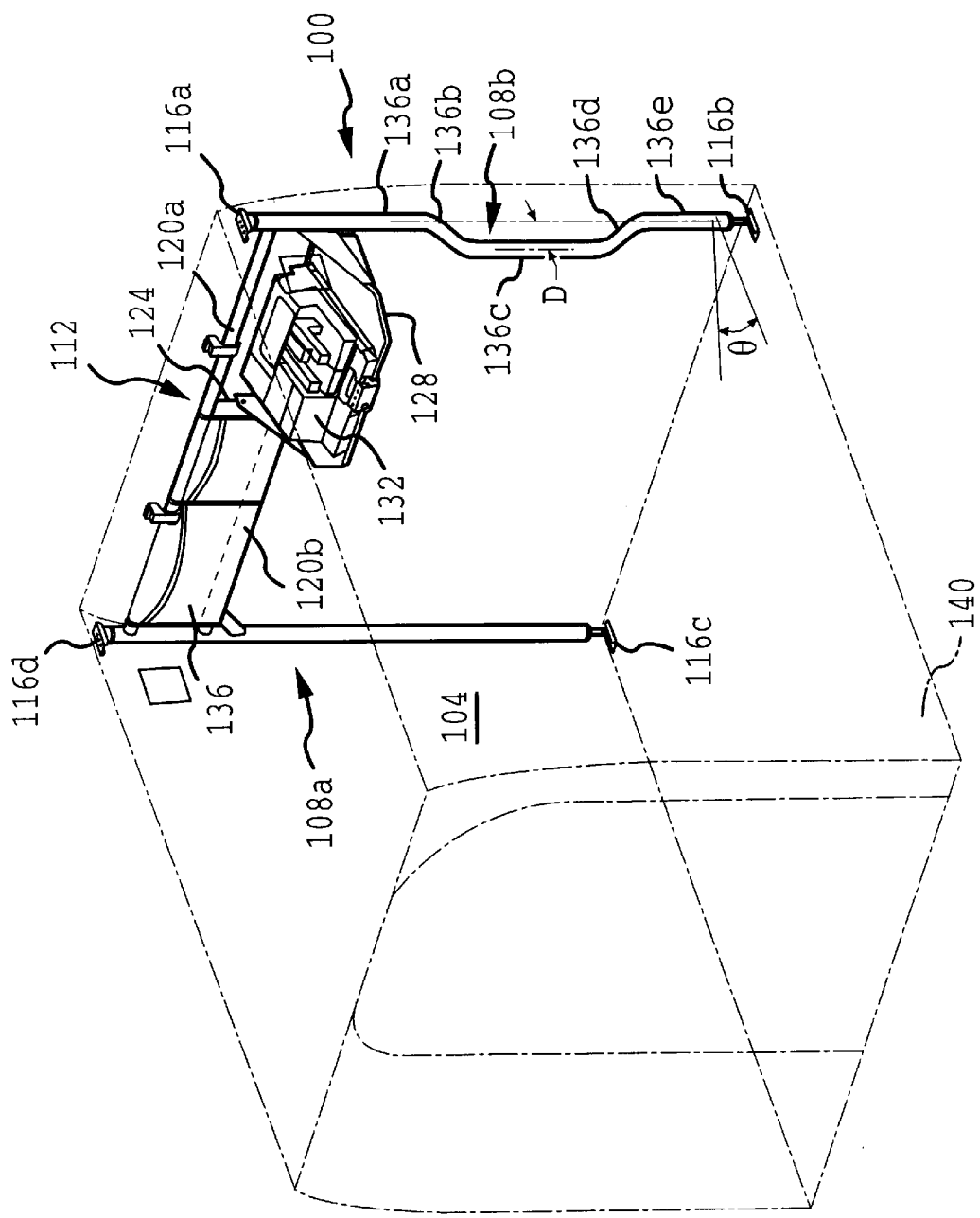
FIG. 1 is a perspective view of an embodiment of the present invention.

FIG. 1 depicts a first embodiment of an equipment mounting rack assembly 100 according to the present invention positioned within a patient transport area 104 of a transport aircraft (not shown). The equipment mounting rack assembly 100 includes first and second support legs 108a,b, equipment mounting rack 112, and releasable fasteners 116a–d. Typically, the support legs are configured such that the fasteners connect to fittings bolted to existing hard points on the structural members (not shown) of the aircraft. In this manner, few, if any, modifications to the aircraft interior and structural frame are required to accommodate the equipment mounting rack assembly.

The equipment mounting rack 112 includes upper and lower crossmembers 120a,b, a center support member 124, and equipment mounting frame 128 which attaches to the crossmembers. The equipment mounting frame is configured to interconnect to medical equipment 132. Pouches 136 are mounted on the left half of the equipment mounting rack for storage of smaller medical instruments and equipment items. As will be appreciated, the components attached to the crossmembers 120a,b depend upon the application.

The first and second support legs 108a,b each include first, second, third, fourth, and fifth segments 136a–e. First, third and fourth segments 136a,c,e are substantially straight and parallel to one another. The centerline of third segment 136c is offset an offset distance "D" from the centerlines and of first and fifth segments 136a,e. The offset distance "D" preferably ranges from about ½" to about 5 inches.

The second and fourth segments 136b,d are curved to cause the support leg to buckle in a predetermined manner in the event that a compressive load, such as that experienced by crash loading, is applied to the support legs. The shear stress along the first, third and fifth segments is significantly less than that along the second and fourth segments of the support legs. The shear stress in the first, third, and fifth segments is no more than about 90% of the shear stress in the second and fourth segments. Because the support legs have a significantly lower shear strength than compressive strength, the support legs will plastically deform first along the curved second and fourth segments and not along the first, third and fifth segments. In this manner, the support leg will bow outwardly during crash loading and inhibit the puncturing of sensitive parts of the aircraft by the support legs. By way of example, many models of helicopters have a fuel bladder located below the patient transport area of the aircraft.

The plane containing the second through fourth segments of both support legs is angled inwardly towards the patient transport area by an angle "φ" relative to the plane of the side 140 of the patient transport area 104 to cause the legs to bow towards the interior of the patient transport area during crash loading. The positions of the second through fourth segments further permit them to be used as handles by passengers during flight. The magnitude of the angle "φ" preferably ranges from about 5 to about 90 degrees.

The support legs and crossmembers are typically of tubular construction and the equipment mounting rack assembly is composed of a durable lightweight material, such as aluminum or titanium, to maintain a low weight for the assembly.

Figure 2:
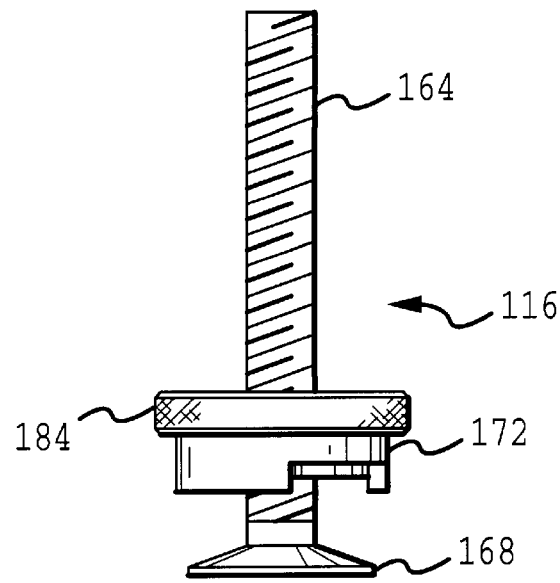
FIGS. 2–4A–C depict the releasable fasteners and base used in the embodiment.
Figure 3:
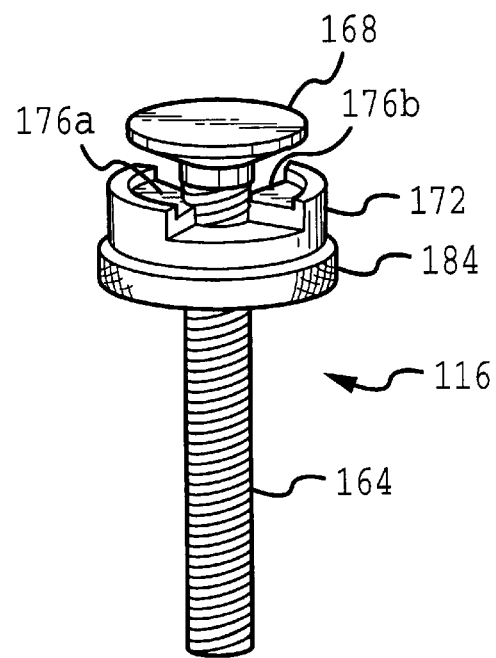
Figure 4A:
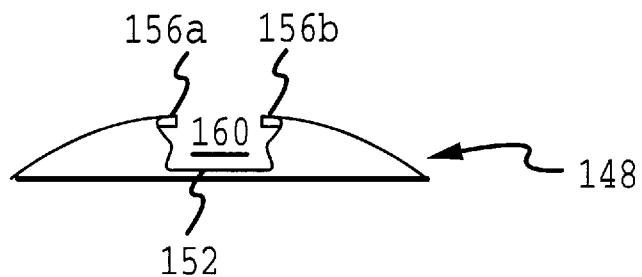
Figure 4B:
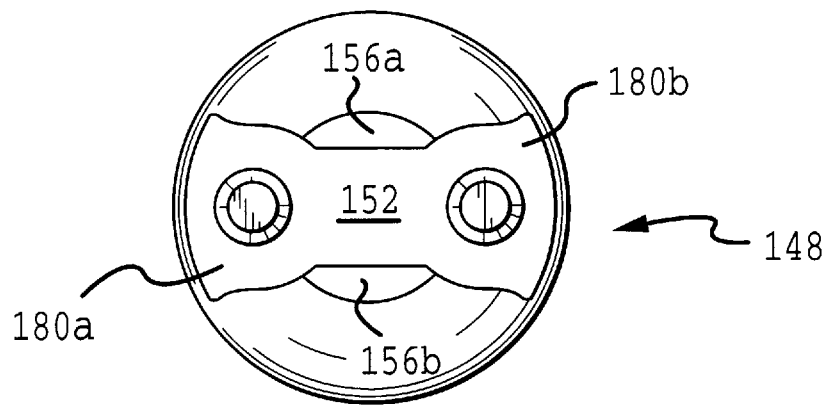
Figure 4C:
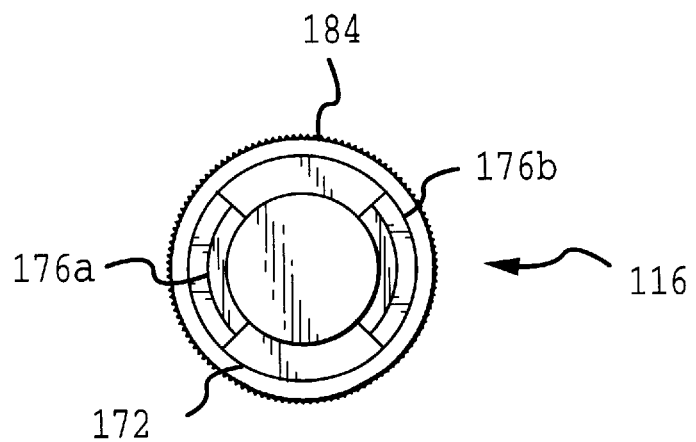

Referring to FIGS. 2–4, the releasable fasteners 116a–d releasably attach to a base 148 bolted to the aircraft structural member(s). As shown in FIG. 4C, the base 148 in side view has the shape of a "C" with the base portion 152 and arm portions 156a,b forming a slot 160. As shown in FIGS. 2–4, the releasable fastener includes a threaded central portion 164 having a tabular head 168 that is received within the slot 160, a locking member 172 having opposing raised portions 176a,b that have the same curvature as and are received by opposing sides 180a,b of the arm portions 156a,b of FIG. 4B, and a hand tightening member 184 to lockably engage the locking member 172 with the base 148.

As will be appreciated, the relative positions of the base and releasably fastener can be reversed. Thus, the tabular head 168 and locking member 172 can be attached to the base and the C-shaped portion of the base attached to the threaded central portion 164.

In operation, the equipment mounting rack assembly 100 having the desired equipment for the aircraft mission is selected. The releasable fasteners 116a–d of the rack assembly 100 are aligned with the slots of the bases and the tabular heads 168 on each fastener inserted in the slot of the appropriate base. The locking member 172 of each fastener is aligned and engaged with the base, and the hand tightening member 184 screwed down the threads on the threaded central member until the fastener is releasably locked in position. The steps are repeated fastener by fastener until the rack assembly is locked in position.

To remove the rack assembly for repair and/or replacement, the hand tightening members of the fasteners are loosened, and the locking members disengaged from the bases. The rack assembly is then removed by pulling the tabular members out of the slots.

The insertion and removal of the rack assembly requires few, if any, tools and takes only a few moments. Thus, rack assemblies mounting medical or other equipment suitable for specific types of missions can be readily interchanged before each mission, even in the event of an emergency mission.

Figure 5:
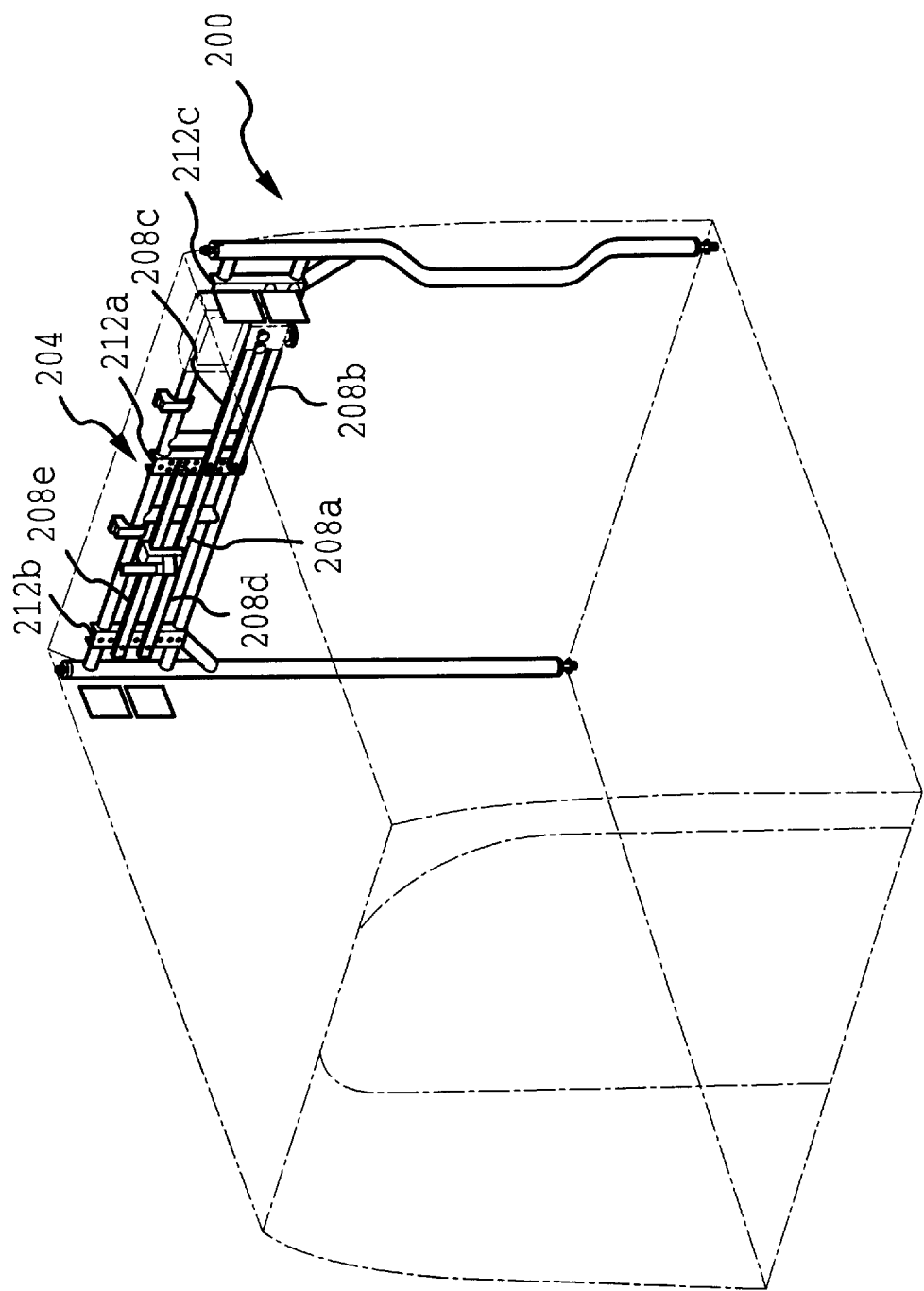
FIG. 5 is a perspective view of another embodiment of the present invention.

FIG. 5 depicts another embodiment of the equipment mounting rack assembly. The assembly 200 of FIG. 5 is the same as that of FIG. 1 except for the configuration of the equipment rack 204. A number of tabular crossmembers 208a–e are attached between the support legs for attaching to different items of equipment. Attachment members 212a–c are mounted crosswise to the crossmembers for attaching to the tabular crossmembers.

Figure 6A:
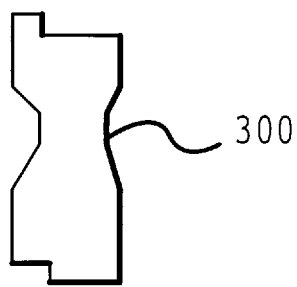
FIGS. 6A–E depict other embodiments of the buckling means.

FIGS. 6A–E depict alternative configurations of the second and fourth segments of the support legs to cause deformation of the support leg in a predetermined manner in response to crash loading. In FIG. 6A, the second and/or fourth segments include a portion 300 having a smaller cross-section than the remainder of the support leg. As will be appreciated, the "necked" portion of the support leg will have a higher total loading stress than the remaining portions of the support leg due to the decreased cross-sectional area. Typically, the cross-sectional area of the "necked" portion of the second and/or fourth segments is no more than about 90% of the cross-sectional area of the adjacent first, third and fifth segments of the support leg. As a result, the total loading stress along the necked portion 300 is at least about 90% of the total loading stress along the first, third and fifth segments of the support leg.

Figure 6B:
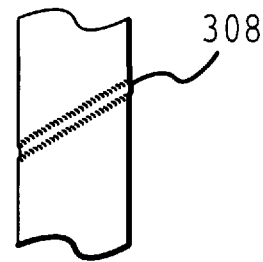

In FIG. 6B, a joint 308, such as a weld, is located in the second and/or fourth segments of the support leg. As will be appreciated, the joint will weaken the strength of the support leg at the location of the joint. Preferably, the stress to failure of the joint is no more than about 90% of the stress to failure of the remaining segments of the support leg.

Figure 6C:
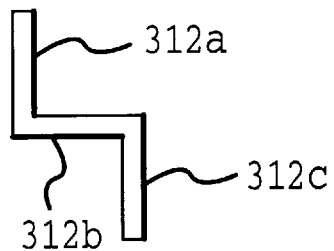
Figure 6D:
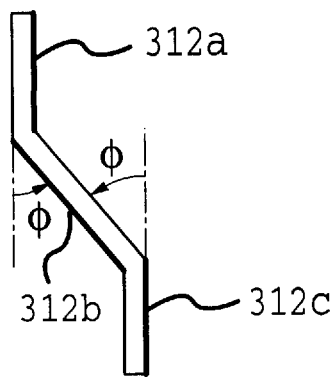

In FIGS. 6C and 6D, the second and/or fourth segments of the support leg are transverse to the adjacent segments of the support leg. The second and/or fourth segments are substantially straight with relatively sharp bends or angles at their ends. Preferably, the angle "φ" between the second or fourth segment 312b and the adjacent segments 312a,c ranges from about 5 to about 90 degrees.

Figure 6E:
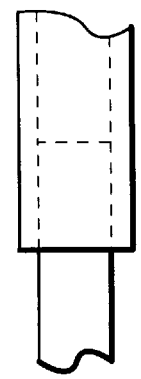

Finally, in FIG. 6E the second and/or fourth segments are telescopically mounted to the adjacent segment of the support leg. The telescopic interconnection of the segments will cause the support leg to plastically deform initially in the narrower second and/or fourth segments.

As will be appreciated, a shear pin can be located on the second and/or fourth segments to cause failure at a predetermined shear stress exerted on the pin.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. An equipment mounting system for use in a transport aircraft, comprising:
    a support leg having upper and lower ends for engaging a structural member of the aircraft and first, second and third segments, the second segment being located between the first and third segments and the first and third segments being substantially parallel to one another; and
    an equipment mounting rack attached to the support leg, wherein the second segment is transverse to the first and third segments to cause the support leg to deform in a predetermined manner in response to a compressive load applied to at least one of the upper and lower ends of the support leg.

2. The equipment mounting system of claim 1, wherein the first and third segments are offset by an offset distance and the offset distance ranges from about ½ to about 5 inches.

3. The equipment mounting system of claim 1, wherein the second segment is oriented at an angle to the first segment and the angle ranges from about 5 to about 90 degrees.

4. The equipment mounting system of claim 1, wherein the first and third segments are oriented such that no more than about 90% of the total stress in the first segment in response to the compressive load is shear stress.

5. The equipment mounting system of claim 1, wherein the second segment is oriented such that at least about 90% of the total stress in the first segment in response to the compressive load is shear stress.

6. The equipment mounting system of claim 1, wherein each of the upper and lower ends includes a fastener for engaging a fitting on the structural member, with one of the fastener and fitting having a C-shaped member and the other one of the fastener and fitting having a protruding member to be received between opposing arms of the C-shaped member, whereby the support leg removably engages the structural member.

7. The equipment mounting system of claim 1, wherein the equipment mounting rack comprises first and second crossmembers and the equipment mounting system a plurality of support legs, with the first and second crossmembers extending between at least two adjacent support legs.

8. An equipment mounting system for use in a transport aircraft, comprising:
    a support leg having upper and lower ends for engaging a structural member of the aircraft;
    means for buckling said support leg in response to a compressive load applied to at least one of the upper and lower ends; and
    an equipment mounting rack attached to the support leg, the equipment mounting having at least two crossmembers for supporting equipment, whereby the means for buckling causes the support leg to deform in a predetermined manner in response to the compressive load.

9. The equipment mounting system of claim 8, wherein the means for buckling is at least one of the following: a segment of the support leg that is oriented transversely to adjacent segments of the support leg, a segment of the support leg that has a smaller cross-sectional area than surrounding segments of the support leg, a joint that is located between adjacent segments of the support leg, a segment of the support leg that is telescopically received by another segment of the support leg, and a shear pin located between adjacent segments of the support leg.

10. The equipment mounting system of claim 9, wherein the means for buckling causes at least one of the total stress and shear stress in a segment of the support leg to be substantially greater than the corresponding one of the total stress and shear stress in other segments of the support leg.

11. The equipment mounting system of claim 10, wherein the at least one of the total stress and shear stress in the other segments of the support leg is no more than about 90% of the corresponding one of the total stress and shear stress in the segment of the support leg.

12. The equipment mounting system of claim 10, wherein the failure load of the segment is no more than about 90% of the failure load of the other segments.

13. The equipment mounting system of claim 10, wherein the cross-sectional areas of the other segments are at least about 90% of the cross-sectional area of the segment.

14. The equipment mounting system of claim 8, wherein the support leg comprises means for releasably engaging the upper and lower ends of the support leg to a structural member of the aircraft.

15. The equipment mounting system of claim 8, wherein each of the upper and lower ends includes a fastener for engaging a fitting on the structural member, with one of the fastener and fitting having a C-shaped member and the other one of the fastener and fitting having a protruding member to be received between the arms of the C-shaped member, whereby the support leg removably engages the structural member.

16. The equipment mounting system of claim 8, wherein the equipment mounting rack comprises first and second crossmembers and the equipment mounting system a plurality of support legs, with the first and second crossmembers extending between at least two adjacent support legs.

17. An equipment mounting system for use in a patient transport aircraft, comprising:
    support legs having upper and lower ends for engaging a structural member of the aircraft, wherein each of the upper and lower ends includes a fastener for engaging a fitting on the structural member, with one of the fastener and fitting on each of the upper and lower ends having a C-shaped slot and the corresponding one of the fastener and fitting on the structural member having a protruding member to be received in the slot, whereby the support leg removably engages the structural member;
    means for releasably engaging the upper and lower ends of at least one of the support legs with the structural member; and
    an equipment mounting rack comprising first and second crossmembers for supporting equipment, the crossmembers extending between at least two adjacent support legs, whereby the equipment mounting rack is readily removable from the aircraft.

18. The equipment mounting system of claim 17, wherein a support leg includes first and second segments and the first segment is oriented transversely to the second segment to cause the support leg to deform in a predetermined manner in response to a compressive load applied to at least one of the upper and lower ends of the support leg.

19. An equipment mounting system for use in a patient transport aircraft, comprising:
    support legs having upper and lower ends for engaging a structural member of the aircraft, wherein a support leg includes means for buckling said support leg in response to a compressive load applied to at least one of the upper and lower ends of the support legs;
    means for releasably engaging the upper and lower ends of at least one of the support legs with the structural member; and
    an equipment mounting rack comprising first and second crossmembers for supporting equipment, the crossmembers extending between at least two adjacent support legs, whereby the equipment mounting rack is readily removable from the aircraft.

* * * * *